United States Patent [19]

Salant et al.

[11] Patent Number: 4,491,331
[45] Date of Patent: Jan. 1, 1985

[54] GROOVED MECHANICAL FACE SEAL

[75] Inventors: Richard F. Salant, Arlington Heights, Ill.; Clinton A. Boyd, Tulsa, Okla.

[73] Assignee: Hughes Tool Company, Houston, Tex.

[21] Appl. No.: 578,985

[22] Filed: Feb. 13, 1984

Related U.S. Application Data

[63] Continuation of Ser. No. 334,021, Dec. 23, 1981, abandoned.

[51] Int. Cl.³ .............................................. F16J 15/34
[52] U.S. Cl. ............................ 277/96.1; 277/93 SD; 277/215
[58] Field of Search ................. 277/3, 27, 81 R, 93 R, 277/93 SD, 94, 96, 96.1, 96.2, 87, 133, 134, 213–215

[56] References Cited

U.S. PATENT DOCUMENTS

| | | | |
|---|---|---|---|
| 1,667,337 | 4/1928 | Weston . | |
| 2,247,505 | 7/1941 | Kohler | 286/8 |
| 3,015,506 | 1/1962 | Tracy | 277/96.1 X |
| 3,141,677 | 7/1964 | Williams | 277/3 |
| 3,147,013 | 9/1964 | Tracy | 277/67 |
| 3,227,463 | 1/1966 | Wiese | 277/93 |
| 3,527,465 | 9/1970 | Guinard | 277/27 |
| 3,628,799 | 12/1971 | Wiese | 277/27 |
| 3,638,957 | 2/1972 | Marsi | 277/96 |
| 3,640,541 | 2/1972 | Taschenberg | 277/96 |
| 3,704,019 | 11/1972 | McHugh | 277/27 |
| 3,770,179 | 11/1973 | McHugh | 277/2 |
| 3,804,424 | 4/1974 | Gardner | 277/27 |
| 3,843,140 | 10/1974 | Mayer et al. | 277/96.1 X |
| 3,957,276 | 5/1976 | Wiese | 277/22 |
| 4,099,729 | 6/1978 | Nykykke | 277/96.1 X |
| 4,142,731 | 3/1979 | Filippov et al. | 277/96.1 X |

FOREIGN PATENT DOCUMENTS

| | | | |
|---|---|---|---|
| 1470389 | 11/1938 | Fed. Rep. of Germany . | |
| 1221865 | 7/1966 | Fed. Rep. of Germany | 277/96.1 |
| 44096 | 2/1917 | Sweden | 277/96 |
| 735250 | 8/1955 | United Kingdom | 122/5 |
| 751887 | 7/1956 | United Kingdom | 277/96 |

OTHER PUBLICATIONS

Crane Packing Co. drawing-A9T-4500-54-dated 10/29/75.
Crane Packing Co. drawing-D-1000-381-dated 3/20/64.

Primary Examiner—Robert S. Ward
Attorney, Agent, or Firm—Robert A. Felsman; James E. Bradley

[57] ABSTRACT

A seal assembly of the mechanical face seal type has features to reduce leakage across the faces. The seal assembly includes a stationary seal ring through which a rotating shaft passes. A rotating seal ring is mounted around the shaft for rotation therewith. A spring urges the rotating seal ring into contact with the stationary seal ring. A plurality of concentric, nonintersecting grooves are placed on the face of the stationary seal ring to enhance sealing.

3 Claims, 4 Drawing Figures

GROOVED MECHANICAL FACE SEAL

This is a continuation of application Ser. No. 334,021 filed 12/23/81 now abandoned.

BACKGROUND OF THE INVENTION

Large volume submersible pumps, commonly used in oil well production, have a submersible electrical motor that rotates a shaft. The shaft extends through a seal section into a centrifugal pump for rotating the pump. In the seal section, there are several partitions through which the shaft passes. At the entrance and exit of the seal section and in the partitions, mechanical face seals are mounted to seal the interior from exterior well fluid.

A typical mechanical face seal has an annular stationary member that is mounted to the wall structure. A rotating seal member is coupled to the shaft to rotate with the shaft. The rotating seal member has a face that is urged into contact with the stationary face by means of a coil spring. A pressure compensator in the motor section or seal section provides a low pressure differential between the interior lubricant and the exterior well fluid. The seal members reduce lubricant leakage to the exterior, and well fluid leakage into the pump from the exterior.

Normally, the faces of the rotating and stationary seal rings are planar, smooth surfaces. For differing reasons, proposals have been made in the prior art to apply various configurations of grooves to the faces of mechanical face seals in general.

SUMMARY OF THE INVENTION

In this invention, the seal assembly has a stationary seal ring fixed to wall structure. A rotating seal ring is fixed to the shaft for rotation therewith. A spring urges the rotating seal ring into rotating contact with the stationary seal ring. The stationary face has at least one concentric groove formed in it. This groove is empty, and defines a closed annular cavity in contact with the opposite face. Preferably a number of concentric grooves, each spaced apart by planar annular surfaces, are located on the stationary face.

DESCRIPTION OF THE PREFERRED EMBODIMENT

Figure 2:
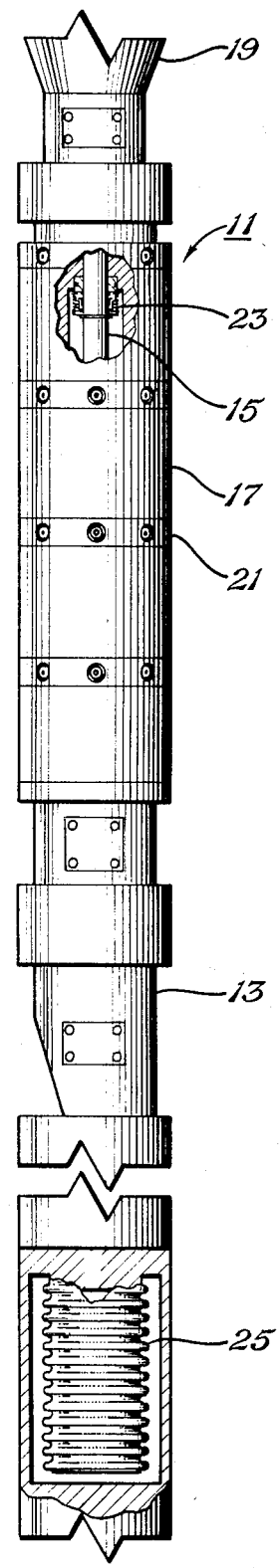
FIG. 2 is a view of the seal assembly of FIG. 1 mounted in a submersible pump.

Referring to FIG. 2, a submersible pump 11 is shown partially. Submersible pump 11 includes an electrical motor 13 which rotates a shaft 15. Shaft 15 extends through a seal section 17 and into a centrifugal pump 19. A number of partitions 21 are located in seal section 17, defining separate chambers. Mechanical face seal assemblies 23 seal the shaft 15 at each partition and also at the ends of the seal section. The motor 13 and the seal section 17 are filled with a lubricating oil. A bellows 25, shown located below motor 13, equalizes the pressure of the interiors of the motor 13 and seal section 17 with the exterior well fluid pressure.

Figure 1:
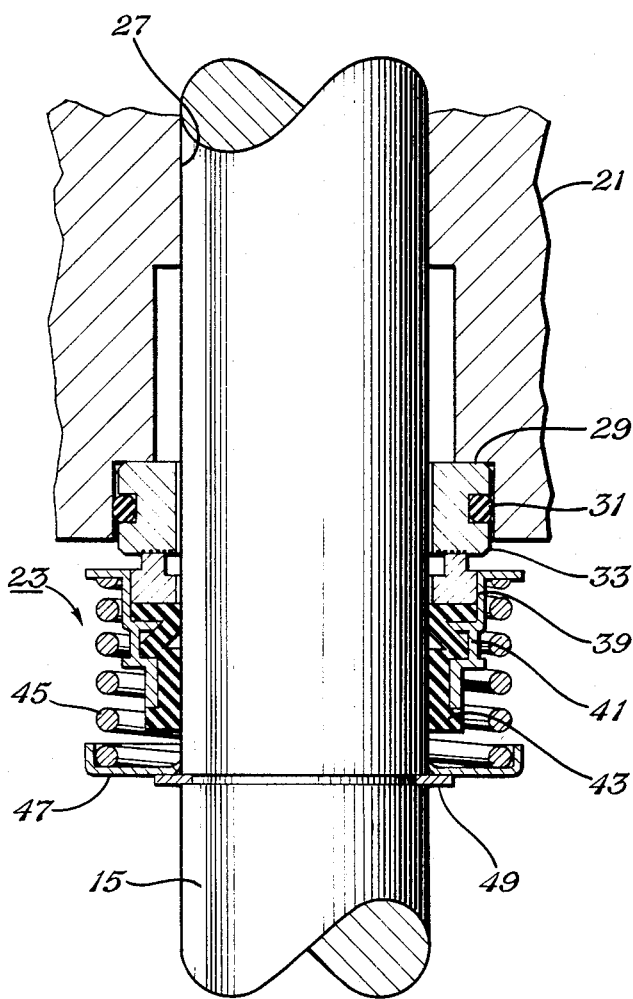
FIG. 1 is a view of a seal assembly constructed in accordance with this invention.

Some or all of the partitions 21 and ends of seal section 17 will have seal assemblies 23 as shown in FIG. 1. Each partition 21 and end of seal section 17 has a passage 27 extending through it for receiving shaft 15. Bushings (not shown) are located in the passage 27 to serve as bearings and maintain shaft 15 in alignment.

Figure 3:
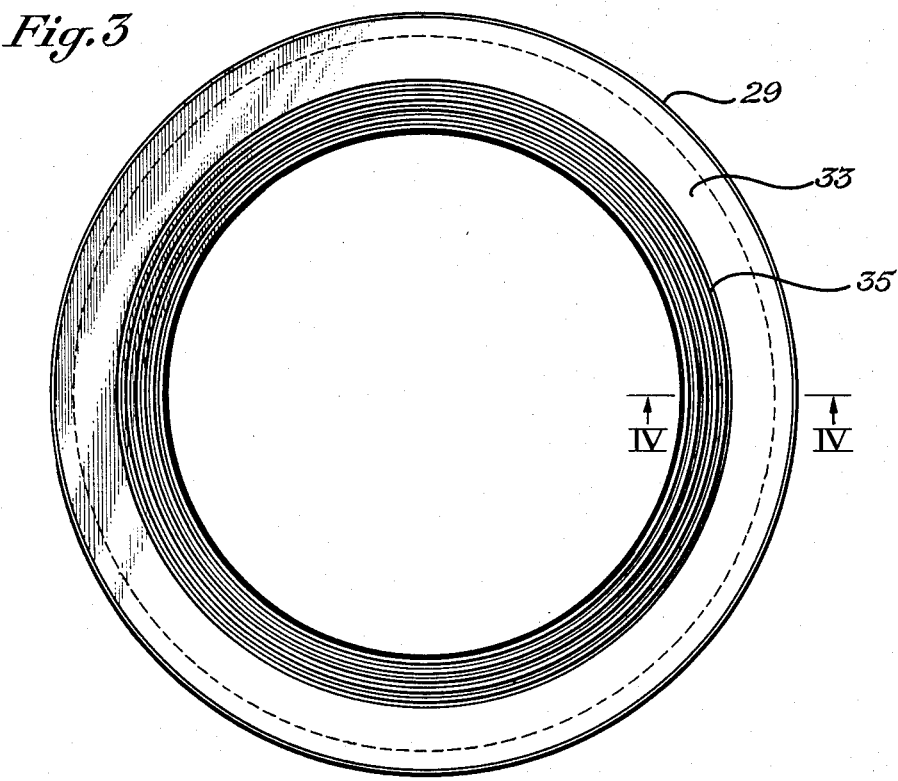
FIG. 3 is a view of the face of the stationary seal ring of the seal assembly of FIG. 1.
Figure 4:
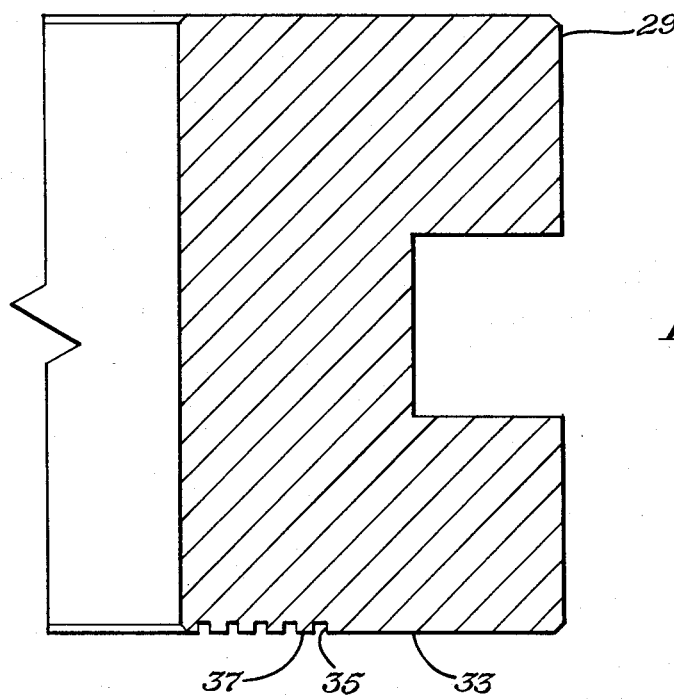
FIG. 4 is a sectional view of the stationary seal ring of the seal assembly of FIG. 1, taken along the line IV—IV of FIG. 3.

A stationary seal ring 29 is mounted at the entrance of passage 27 of the wall structure or partition 21. The exterior of stationary seal ring 29 is sealed by an O-ring 31. Stationary seal ring 29 is of a hard material such as ceramic. Stationary seal ring 29 has a face 33 that faces away from passage 27. As shown in FIGS. 3 and 4, face 33 is planar and free of any cavities but for a plurality of grooves 35 formed in the face. Grooves 35 are concentric with the axis of stationary seal ring 29. Grooves 35 are shown generally square in transverse cross-section although this is not essential. The width at the surface of each groove 35 is about the same as the depth. Also, the land 37, which is the annular planar surface between each groove 35, is about the same radial width as the radial weight of each groove 35. Face 33 is free of any channels, passages or grooves other than grooves 35, so that each groove 35 is a closed circular channel free of intersections with other cavities.

Grooves 35 are very small in radial width and very shallow. However, the radial width of groove 35 should be no smaller than the thickness of the fluid film between stationary seal ring 29 and rotating seal ring 39. Although the rotating ring of a mechanical seal is urged into contact with the stationary face, modern seals are designed such that a very thin fluid film is maintained between the faces to prevent wear. The thickness of this film is of the order of 0.0001 inch. The upper limit of the groove width and depth is not critical, but must be within practical limits for ease in manufacturing and use, and allow the normal limits of face pressure for mechanical face seals.

The other portions of seal assembly 23 are conventional. These portions include a rotating seal ring 39 that is softer than stationary seal ring 29 and preferably carbon. Seal ring 39 has a planar, smooth face that rotates in sliding contact against the face 33 of the stationary seal ring 29. Contact of rotating seal ring 39 against face 33 results in an empty, closed annular space at each groove 35. The fluid film between the faces is prevented from leaking into the grooves by the action of surface tension forces. A collar 41 secures an elastomeric boot 43 to rotating seal ring 39. Boot 43 fits tightly around shaft 15 to provide sealing. The inner diameter of rotating seal ring 39, as well as the inner diameter of stationary seal ring 29, is larger than the diameter of the shaft 15, providing a clearance. Boot 43 seals liquid from passing through these clearances. A coil spring 45 is compressed between collar 41 and a circular flange 47. A retaining ring 49 in a groove in shaft 15 locates flange 47.

Coil spring 45 will exert a force against rotating seal ring 39, which presses against stationary seal ring 29, resulting in a face pressure that is the force divided by the contacting surface areas of seal rings 29 and 39. Coil spring 45 is conventionally sized to provide 10 to 40 psi (pounds per square inch) pressure of rotating seal ring 39 against stationary seal ring 29. The optimum range is 20 to 30 psi, preferably 24 psi. Minimum and maximum face pressures can also take into account rotational speeds. At a typical rotational speed of 3450 revolutions per minute, the minimum and maximums are 235 psi foot/sec. (pounds per square inch×feet divided by seconds), and 942 psi feet/sec. for a ceramic stationary seal ring 29 and carbon rotating seal ring 39. Generally, higher rotational speeds require less spring force than lower speeds.

The maximum number and maximum widths of grooves 35 must not cause the face pressures to exceed the maximum limits mentioned. Grooves 35 reduce the contacting surface area of seal rings 29 and 39, and thus increase the pressure for a selected spring 45. For a low pressure differential across the seals of less than 5 psi, a single groove 35 is feasible with a radial width from 0.003 to 0.020 inch for a contacting face 39 with a radial width of 0.115 inch. For higher differential pressure, 5-20 psi, a plurality of concentric grooves is preferably used with radial widths preferably from 0.003 to 0.005 inch for the same face widths. The preferred depth of grooves 35 is 0.005 inch. Each land 37 is preferably 0.005 to 0.010 inch in radial width. The number of grooves 35 may feasibly range from about 1 to 14, preferably 8-14, for the above dimension of seal face 39. A preferred seal 29 for the above face dimensions of seal ring 39 has eight grooves 35 of 0.005 inch width with lands 37 of 0.010 inch width.

In operation, motor 13 will rotate shaft 15, which in turn rotates pump 19. Normally a mixture of oil and water will be located on the exterior of seal section 17, with lubricant in the interior. Bellows 25 will reduce the pressure differential between the interior and the exterior. Rotating seal ring 39 will rotate in unison with shaft 15, while stationary seal ring 29 remains fixed to partition 21. The sliding contact of the faces of the rotating seal ring 39 and stationary seal ring 29 serve to reduce leakage of lubricant past the seal assembly 23 to the exterior should internal pressure exceed the external pressure. Also, the contacting faces of the stationary seal ring 29 and rotating seal ring 39 serve to reduce leakage of well fluid into the interior of the seal section 17 should the external pressure exceed the internal pressure.

Laboratory testing has indicated that the grooves 35 enhance the ability of the seal assembly to prevent leakage. Testing indicates that leakage of well fluid into the seal section may be completely eliminated for a fairly long duration, while conventional mechanical face seals always leak to some extent. The reasons for the improved results are not completely understood. Possibly the grooves provide a gas trap, improved lubricating of the contacting faces, or a means to produce a uniform circular path flow opposed to the random flow movement in conventional seal faces, or a combination of all of these.

The invention has significant advantages. The grooves enhance sealing, reducing the entry of well fluid into the seal section and the egress of lubricant. This may increase the duration that a pump can operate without removing the pump for maintenance.

While the invention has been shown in only one of its forms, it should be apparent to those skilled in the art that it is not so limited but is susceptible to various changes and modifications without departing from the spirit of the invention.

I claim:

1. In a seal assembly for a rotating shaft having an axis and extending through wall structure, the seal assembly having a stationary seal ring with a circular face with a flat surface and carried stationarily by the structure, a rotating seal ring carried by the shaft for rotation therewith and having a circular face with a flat surface, and spring means for urging the flat surfaces of the faces into engagement with each other, the improvement comprising:
    at least one circular groove concentric with the axis of the shaft and recessed within the flat surface of the face of the stationary seal, the groove being free of intersections with any cavities in either face to define with the rotating face a closed, annular space.

2. An improved seal assembly for sealing around a shaft having an axis and passing through a wall structure, comprising in combination:
    a stationary seal ring having a circular face and fixed to the wall structure;
    a rotating seal ring carried by the shaft for rotation therewith, the rotating seal ring being of a material that is softer than the material of the stationary seal ring and having a circular face; and
    spring means for urging the face of the rotating seal ring into rotating engagement with the face of the stationary seal ring;
    the stationary face having recessed within it a plurality of non-intersecting circular grooves concentric with the axis of the shaft and defining with the rotating seal face a plurality of closed, annular cavities substantially free of liquids, each groove being separated from other grooves and encircled by circular lands which have flat faces that are located in a single plane perpendicular to the axis of rotation and which are engaged by the face of the rotating seal ring.

3. In a submersible pump of the type having a motor with rotating shaft having an axis and extending through a seal section to drive a centrifugal pump, an improved seal assembly for preventing leakage around the shaft, comprising in combination:
    a stationary seal ring fixed to the seal section, the stationary seal ring having a circular flat planar face containing a plurality of circular grooves recessed within and concentric with the axis of the shaft, each groove being separated from the other grooves by circular planar surfaces, the grooves being free of intersections with any cavities;
    a rotating seal ring carried by the shaft for rotation therewith, the rotating seal ring being of a material that is softer than the material of the stationary seal ring and having a flat planar face; and
    spring means for urging the face of the rotating seal ring into rotating engagement with the face of the stationary seal ring;
    the areas of the engaging surfaces of the rings and the force of the spring means cooperating to provide a face pressure in the range from 10 to 40 psi.

* * * * *